UNITED STATES PATENT OFFICE.

WILHELM HERZBERG AND OTTO SIEBERT, OF BERLIN, GERMANY, ASSIGNORS TO ACTIEN GESELLSCHAFT FÜR ANILIN FABRIKATION, OF BERLIN, GERMANY.

RED AZO DYE.

SPECIFICATION forming part of Letters Patent No. 704,825, dated July 15, 1902.

Application filed March 3, 1902. Serial No. 96,440. (Specimens.)

*To all whom it may concern:*

Be it known that we, WILHELM HERZBERG and OTTO SIEBERT, of Berlin, in the Kingdom of Prussia, German Empire, have invented new and useful Improvements in the Production of Red Azo Dyes; and we do hereby declare that the following is a full, clear, and exact description of the invention, which will enable others skilled in the art to which it appertains to make and use the same.

We have discovered that para-substituted meta-amido-alphyl-sulfamido compounds represented by the typical formula—

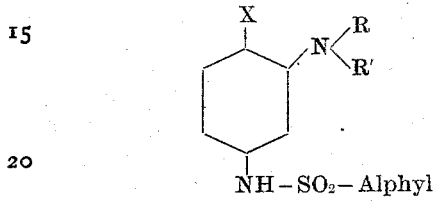

(in which X means a substituted group, R and R' hydrogen atoms, which may be replaced by alkyl radicals) constitute most valuable components for the production of azo dyestuffs when combined with diazotized para-nitro-ortho-amido-salicylic acid represented by the formula—

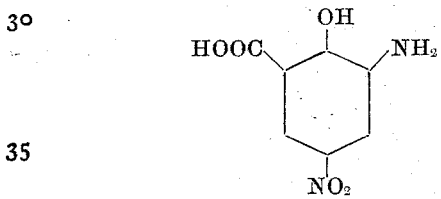

The dyestuffs thus formed dye wool directly in an acid-bath yellowish-red shades. If the dyed goods be subjected to a subsequent treatment with chromates or if dyeing be effected in the way described in the United States Letters Patent No. 661,985, the shades become more bluish and get at the same time an extraordinary fastness to soaping, milling, and to the action of light or of sulfurous acid. As to the meta-amido-alphyl-sulfamido compounds which we employ as starting products, they may be easily obtained by condensing a para-substituted meta-nitroamin or a para-substituted mono-alkylated or asymmetrically-dialkylated meta-diamin of the benzene series with an aromatic sulfochlorid. In the first case a subsequent reduction is necessary in order to convert the nitro group into an amido group. For instance, the ortho-amido-para-toluol-para-sulfamido-toluol represented by the typical formula—

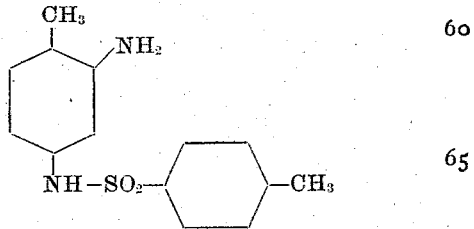

is prepared as follows: 15.2 parts of ortho-nitro-para-amido-toluol are suspended in one hundred and fifty parts of water, and while stirring well and heating the mixture on the water-bath twenty parts of para-toluolsulfochlorid are added thereto. In order to complete the reaction, six parts of sodium carbonate are gradually added. The condensation product thus formed may be directly filtered off. It is purified by re-solution in diluted alkali lye and reprecipitation by means of hydrochloric acid. It melts at 164° centigrade. In order to transform this nitro compound into the corresponding amido compound, it is subjected to the action of zinc-dust and hydrochloric acid or any other appropriate reducing agent.

The new product dissolves easily in diluted alkalies, as well as in diluted mineral acids. From the solutions thus obtained it may be precipitated by the addition of acetic acid or sodium acetate, respectively. It forms a white crystalline powder, melting at 160° centigrade.

The following example, in which the parts are by weight, may serve to illustrate the preparation of our new dyestuffs.

*Example—Manufacture of an azo dyestuff from para-nitro-ortho-amidosalicylic acid and ortho-amido-para-toluol-para-sulfamido-toluol.*—Ten parts of para-nitro-ortho-amidosalicylic acid are diazotized in the well-known way, and the diazo solution thus obtained is slowly run into a solution prepared by dissolving 13.8 parts of ortho-amido-para-toluol-para-sulfamidotoluol in five hundred parts of water and two parts of caustic soda while stirring well and keeping the mixture weakly alkaline by the addition of caustic-soda lye. The new dyestuff, which is a sodium salt of an acid having the formula—

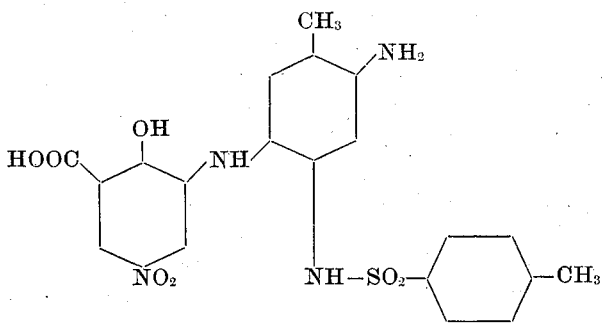

separates directly. It is filtered, pressed, and dried. It forms in the dry state a reddish-brown powder with metallic luster, which dissolves readily in warm water, forming a reddish-brown solution. The aqueous solution turns deep red on addition of caustic-soda lye and assumes a light orange-red coloration on addition of hydrochloric acid. The dyestuff dissolves easily in concentrated sulfuric acid with a dark yellowish-red coloration. The alcoholic solution is yellowish red. The dyestuff produces on wool with the aid of chromium mordants intense yellowish-red shades, remarkable for their fastness to soaping and milling and to the action of light and sulfurous acid.

The result is not materially changed if for the ortho-amido-para-toluol-para-sulfamidotoluol employed in the preceding example an equimolecular proportion of ortho-monoethyl-amido-para-toluol-para-sulfamido-toluol melting at 120° centigrade is substituted.

Having thus described our invention and in what manner the same is to be performed, what we claim as new is—

1. The herein-described new azo dyestuffs which are sodium salts of acids having the formula:

$$C_6H_2 \begin{matrix} (1)\ OH \\ (2)\ N=N-C_6H_2 \\ (4)\ NO_2 \\ (6)\ COOH \end{matrix} \begin{matrix} (1)\ CH_3 \\ (2)\ NH_2 \\ (4)\ NH-SO_2-C_6H_4-CH_3 \end{matrix}$$

(in which X means a substituting group, and R and R' hydrogen atoms, which may be replaced by alkyl radicals) and which are obtained by combining diazotized para-nitro-ortho-amido-salicylic acid with a para-substituted meta-amido-alphyl-sulfamido; said dyestuffs forming in the dry state reddish-brown powders, readily soluble in warm water, forming reddish-brown solutions; the aqueous solutions turning deep red on addition of caustic-soda lye and assuming a light orange-red coloration on addition of hydrochloric acid; the dyestuffs dissolving readily in concentrated sulfuric acid to dark yellowish-red solutions, and in alcohol to yellowish-red solutions; the dyes producing on wool with the aid of chromium mordants yellowish-red shades of great intensity and fastness.

2. The herein-described new dyestuff, which is a sodium salt of an acid having the formula:

$$C_6H_2 \begin{matrix} (1)\ OH \\ (2)\ N=N-C_6H_2 \\ (4)\ NO_2 \\ (6)\ COOH \end{matrix} \begin{matrix} (1)\ CH_3 \\ (2)\ NH_2 \\ (4)\ NH-SO_2-C_6H_4-CH_3 \end{matrix}$$

and which is obtained by combining diazotized para-nitro-ortho-amido-salicylic acid with ortho-amido-para-toluol-para-sulfamidotoluol; said dye forming in the dry state a reddish-brown powder with metallic luster, readily soluble in warm water, forming a reddish-brown solution; the aqueous solution turning deep red on addition of caustic-soda lye and assuming a light orange-red coloration on addition of hydrochloric acid; the dyestuff dissolving readily in concentrated sulfuric acid to a dark yellowish-red solution, and in alcohol to a yellowish-red solution; the dye producing on wool with the aid of chromium mordants yellowish-red shades of great intensity and fastness.

In witness whereof we have hereunto signed our names, this 15th day of February, 1902, in the presence of two subscribing witnesses.

WILHELM HERZBERG.
OTTO SIEBERT.

Witnesses:
WOLDEMAR HAUPT,
HENRY HASPER.